(12) United States Patent
Nariyasu

(10) Patent No.: US 6,293,626 B1
(45) Date of Patent: Sep. 25, 2001

(54) TONGUE FOR AN INFLATABLE BELT AND AN INFLATABLE BELT DEVICE

(75) Inventor: Tutomu Nariyasu, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/318,124

(22) Filed: May 25, 1999

(30) Foreign Application Priority Data

May 25, 1998 (JP) .................................................. 10-143010

(51) Int. Cl.$^7$ .................................................. B60R 21/00
(52) U.S. Cl. .................................................. 297/472
(58) Field of Search .................................. 297/471, 472, 297/216.1, 463.2, 463.1; 280/728.1, 733, 801.1, 808

(56) References Cited

U.S. PATENT DOCUMENTS 3,801,156 * 4/1974 Granig .
5,383,713 * 1/1995 Kamiyama et al. .
5,466,003 * 11/1995 Tanaka et al. .
5,474,326 * 12/1995 Cho .
5,765,869 * 6/1998 Huber .

\* cited by examiner

*Primary Examiner*—Milton Nelson, Jr.
(74) *Attorney, Agent, or Firm*—Foley & Lardner

(57) ABSTRACT

A tongue for an inflatable belt device and the inflatable belt device. One end of the inflatable belt is attached to the rear of the tongue. This connection preferably is concealed by a cover. The cover is preferably constructed from a synthetic resin. Also, the cover preferably is integrally formed with a flange. The flange serves to press on the inflatable belt, thus ensuring that the inflatable belt has a substantially constant thickness over the entirety of its length including the area in the vicinity of the belt-tongue joint. The flange, preferably, has a plurality of tear lines at which the flange tears open into a plurality of flaps when the inflatable belt is inflated. Also, the belt conforming member preferably has a groove at the union of the cover and the flange, which facilitates swiveling of the flange and the flaps about an axis of the groove.

12 Claims, 9 Drawing Sheets

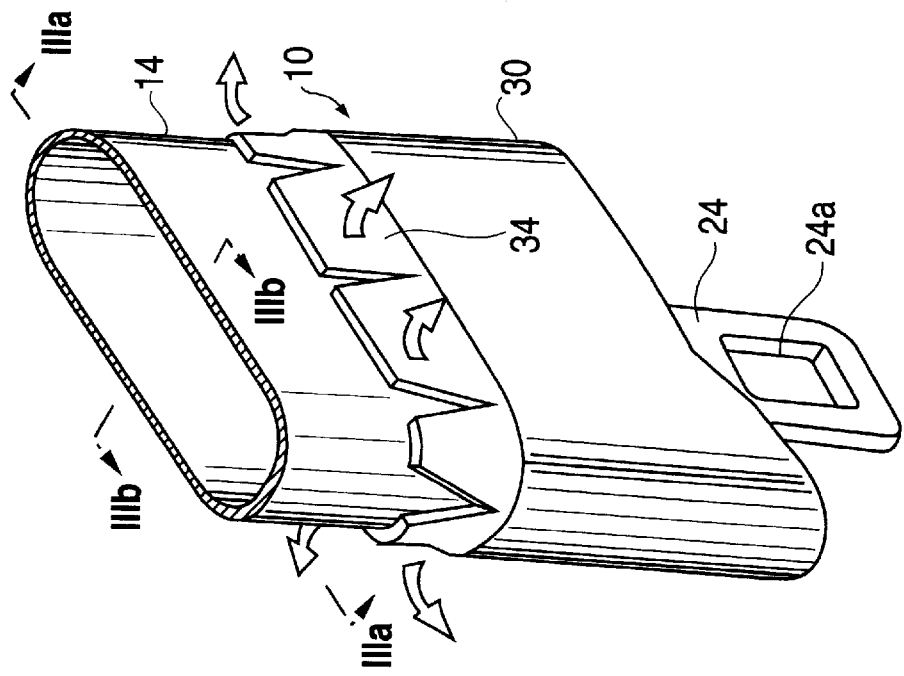
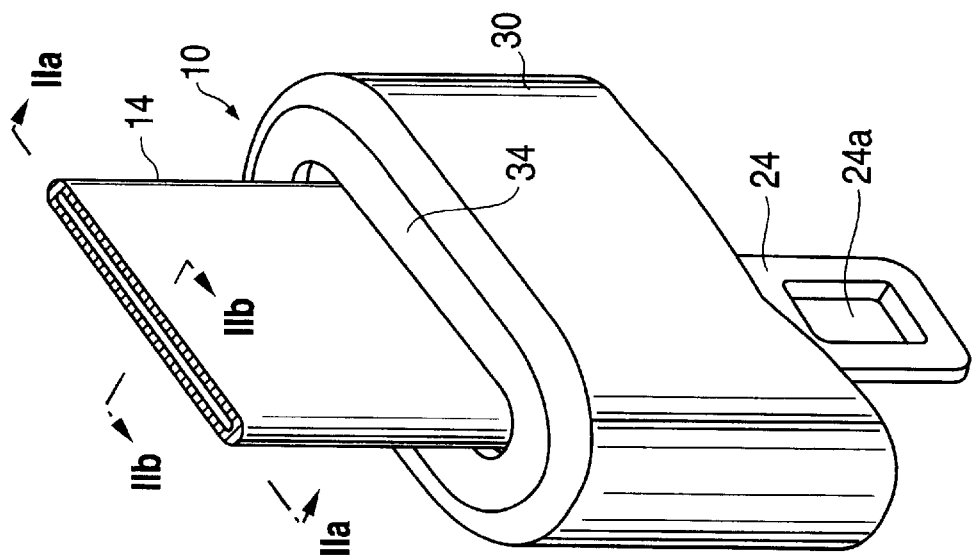

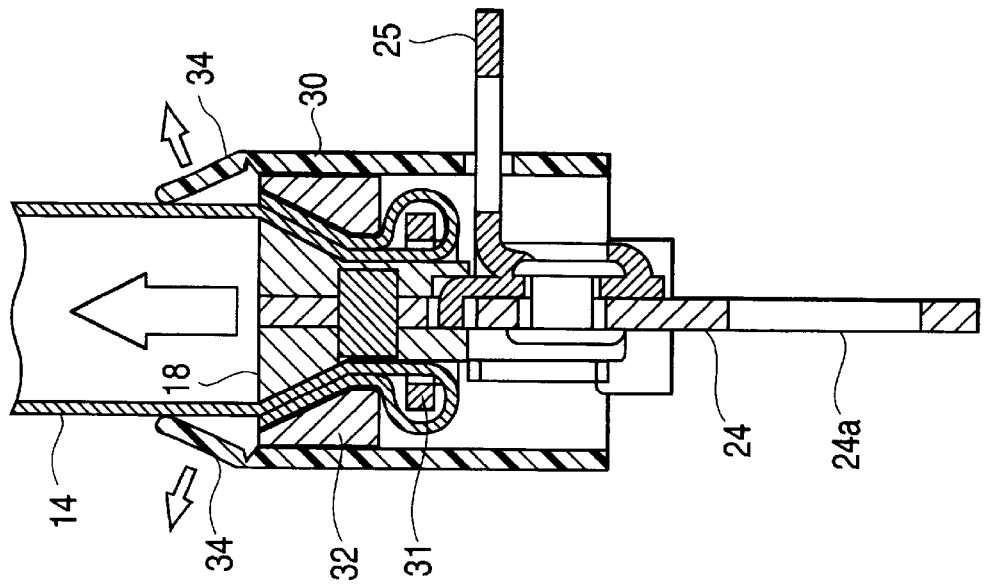
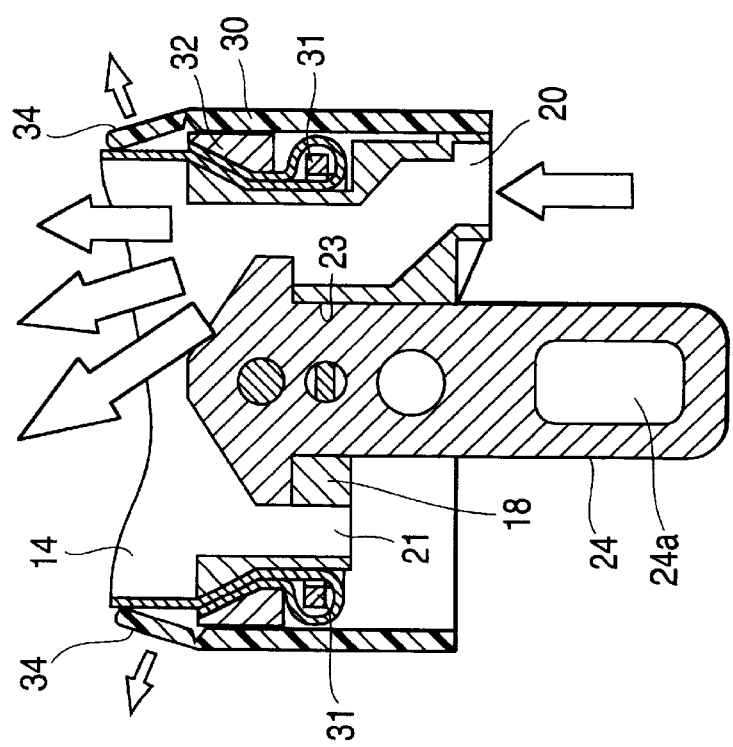

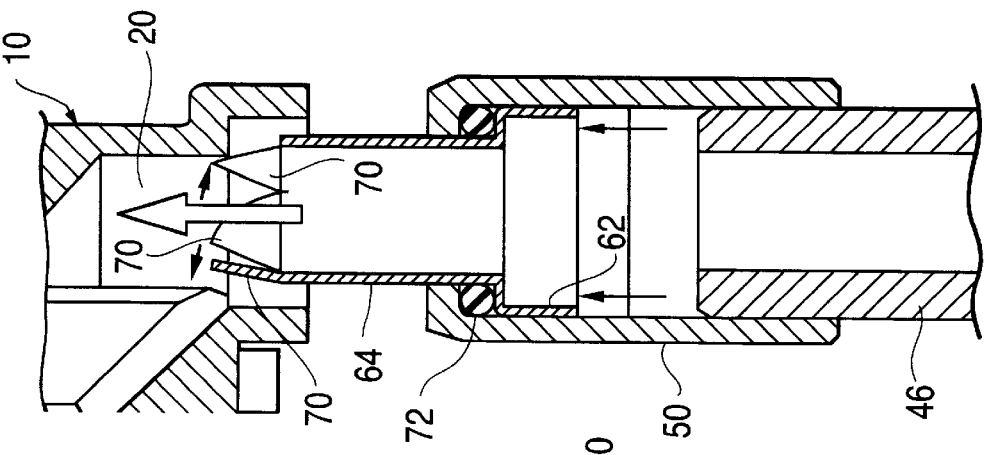
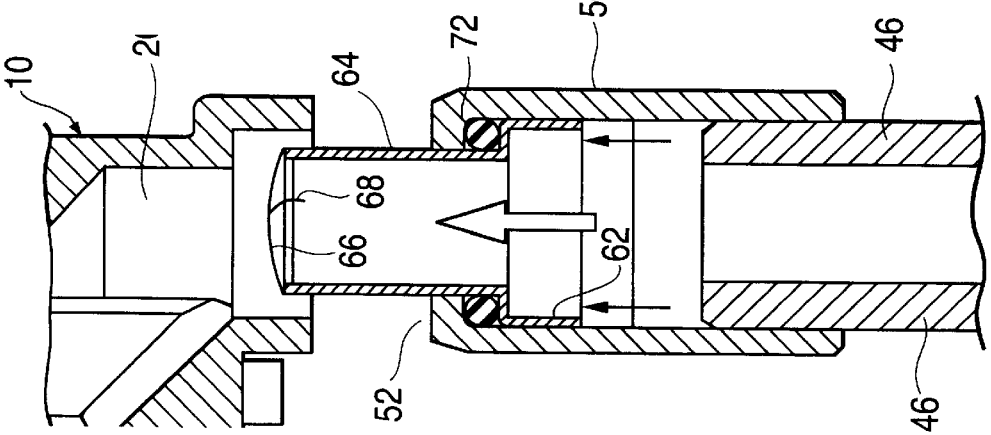
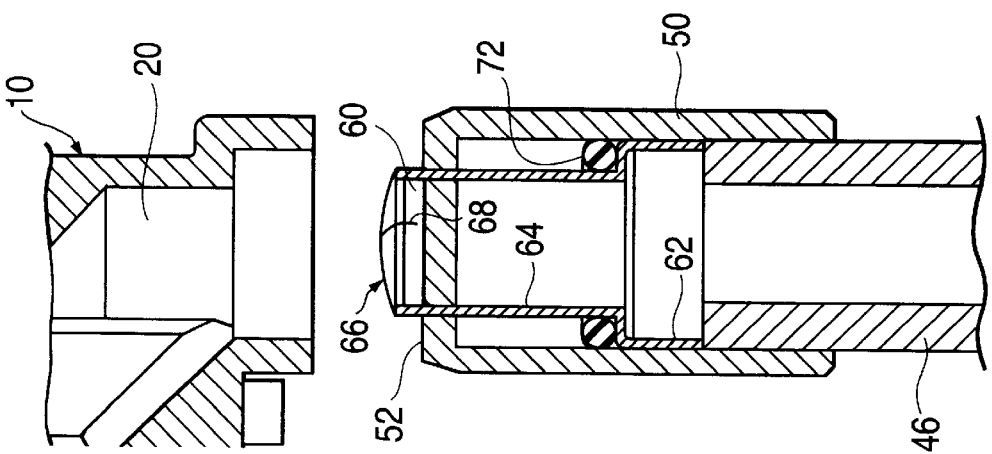

TONGUE FOR AN INFLATABLE BELT AND AN INFLATABLE BELT DEVICE

BACKGROUND OF THE INVENTION

1. Field of the Invention

The present invention relates to a device for protecting an occupant in a motor vehicle during a collision, more particularly, the invention relates to a tongue of an inflatable belt device and to the inflatable belt device itself.

2. Description of the Related Art

An inflatable belt device of this type is disclosed, for example, in Japanese Unexamined Patent Publication HO5-85301. As shown in FIGS. 11(a) and 11(b), the inflatable belt device 1 includes a shoulder belt 2 extending diagonally from the right side to the left side of an occupant, a lap belt 3 extending from the right side to the left side of the occupant, a buckle 4 fixed to, for example, a vehicle floor, a tongue 5 to be inserted into and engaged with the buckle 4 when the occupant wears the seat belt, and an intermediate guide 6 for guiding the shoulder belt 2.

The shoulder belt 2 includes a webbing 2a, which is the same as a typical conventional seat belt, and an inflatable belt 2b connected to an end of the webbing 2a. The webbing 2a. is slidably hung in the intermediate guide 6. The other end of the webbing 2a is connected to a seat belt retractor 7, which has an emergency locking mechanism (ELR) and is fixed to the vehicle body. The webbing 2a is arranged so that it may be wound into the seat belt retractor 7.

The inflatable belt 2b is positioned so that it contacts the occupant, and is connected to the tongue 5 at an end opposite to the end connected to the webbing 2a. The lap belt 3 includes a webbing, which is the same as a typical conventional seat belt, having one end connected to the tongue 5 and the other end connected to a seat belt retractor 8 (ELR), which is fixed to the vehicle body.

A gas generator 9, which is actuated to generate high pressure gas in emergency situations, e.g., a collision, is connected to the buckle 4. The tongue 5 and the buckle 4 have passages allowing gas from the gas generator 9 to flow into the inflatable belt 2b.

The inflatable belt 2b of the shoulder belt 2 has a belt body 2c, which is formed in an envelope shape, and a cover 2d. As shown by the solid lines in FIG. 11(b), the belt body 2c is folded and covered by the cover 2d. Both ends of the cover 2d are then connected, by stitching 2e, so that the inflatable belt 2b maintains a band-like shape during normal operation. The stitching 2e of the cover 2d is easily torn by expansion force of the shoulder belt 2 when the gas generator 9 is actuated so that the inflatable belt 2b is deployed as shown by a two-dot chain line in FIG. 11(b).

The inflatable belt 2b, however, has a tent-like portion in the vicinity of the connection between the inflatable belt 2b and the tongue 5. Similar to what is shown in FIG. 7, the tent-like portion spreads, that is, it gradually thickens in the proximity of the tongue. This tent-like portion has a flabby structure of which the inside is vacant and has a poor feeling when touched.

SUMMARY OF THE INVENTION

Accordingly, it is a general object of the invention to provide a tongue for an inflatable seat belt device, and an inflatable seat belt device, which will obviate or minimize the aforementioned difficulties.

It is a specific object of the invention to provide an inflatable seat belt device in which the inflatable belt assumes a flat band-like shape at the portion adjacent to the tongue.

It is another object of the invention to provide a tongue for an inflatable seat belt device that allows the inflatable seat belt to have a flat band-like shape in an area adjacent to the tongue.

A preferred embodiment of the invention intended to accomplish at least some of the foregoing objects includes a belt conforming member adapted to conform an end of the inflatable belt to the rear end surface of said tongue.

Another preferred embodiment includes a cover covering an outside of the tongue, wherein the belt conforming member includes a flange extending inward from the cover and formed integrally with the cover.

In yet another preferred embodiment, the tongue includes a groove provided along a corner portion between the belt conforming member and the cover.

In a further preferred embodiment, the belt conforming member includes at least one tear line extending outward from an inner periphery of said belt conforming member, such that the flange tears along the at least one tear line.

Additional objects and advantages will be set forth in the following description, and, in part, will be obvious from the description, or may be learned by practicing the invention. The objects and advantages of the invention may be realized and obtained through the instrumentalities and combinations particularly pointed out in the appended claims.

BRIEF DESCRIPTION OF THE DRAWINGS

The accompanying drawings, which are incorporated in and constitute part of the specification, illustrate presently preferred embodiments of the invention, and, together with the above general description and the following detailed description, serve to explain the principles of the invention.

FIG. 1(a) is a perspective view of a tongue according to the embodiment, and

FIG. 1(b) is a perspective view of an inflated inflatable belt connected to the tongue.

FIG. 3(a) is a sectional view taken along the line IIIa—IIIa of FIG. 1(b), and

FIG. 3(b) is a sectional view taken along the line IIIb—IIIb of FIG. 1(b).

FIGS. 10(a), 10(b) and 10(c) are sectional views showing the buckle and the tongue of FIG. 1 in an engaged state.

DETAILED DESCRIPTION OF THE PREFERRED EMBODIMENTS

In one preferred embodiment, the rear portion of the tongue is connected to an inflatable belt. The tongue includes a belt conforming member. The belt conforming member serves to conform the end of the inflatable belt to the rear end surface of the tongue. One advantage of this arrangement is that the inflatable belt has a substantially constant thickness throughout its entirety, thus, resulting in an improved feel and appearance.

In the inflatable belt device of the present invention, which incorporates such a tongue, the inflatable belt assumes a flat band configuration even at the portion adjacent to the tongue because the belt conforming member conforms the inflatable belt to the rear end surface of the tongue.

In the present invention, the belt conforming member is preferably integrated with a tongue cover.

It is also preferable that the belt conforming member be formed as a flange extending inward from the tongue cover. It is especially preferable that the flange be substantially perpendicular to the tongue cover.

It is preferable that the belt conforming member be provided with tear lines, such that the belt conforming member tears open along the tear lines when the inflatable belt is inflated. In this arrangement, after the belt conforming member has torn open, the belt conforming member forms a plurality of flaps.

It is also preferable for the corner portion between the flange-like conforming member and the tongue cover to be formed as a groove. This groove acts as akin to a door hinge, that is, the groove facilitates the swiveling of the flaps about the axis of the groove. The flange thus opens into flaps very easily.

Referring now to the Figures, and initially to FIG. 1(*a*), there will be seen an inflatable seat belt 14, in the vicinity of the tongue 10, in its non-inflated state. There is a cover 30, including a flange 34, that covers the connection of the belt 14 to the tongue 10.

Figure 2A:
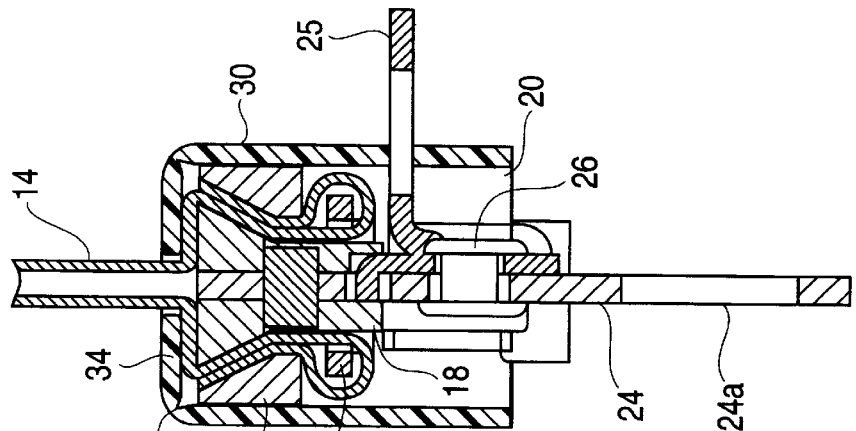
FIG. 2(a) is a sectional view taken along the line Ia—Ia of FIG. 1(a)
Figure 2B:
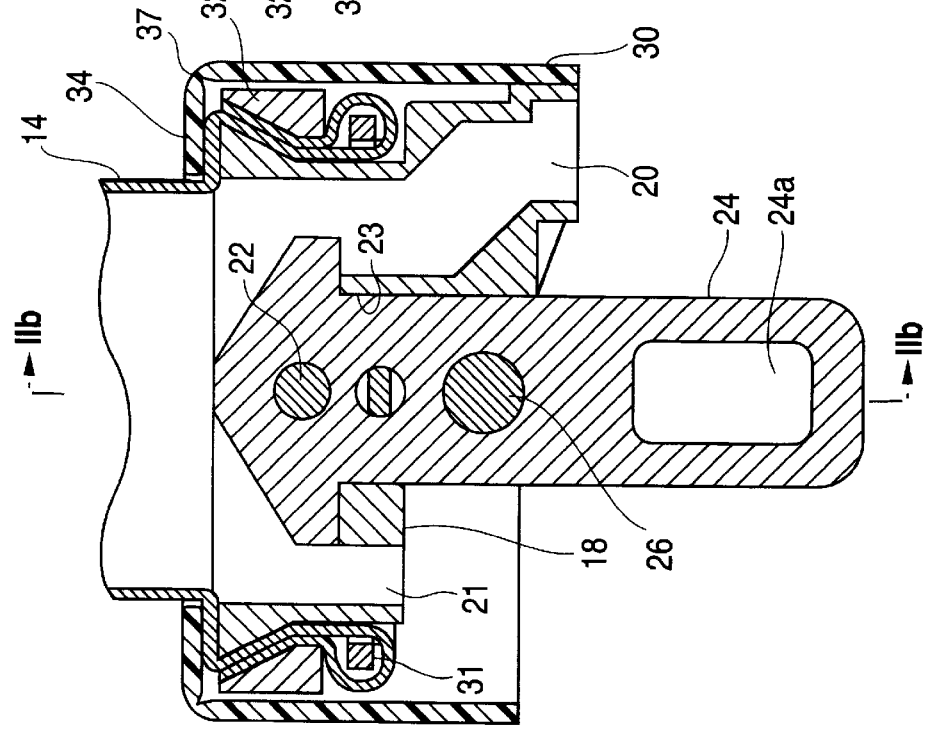
FIG. 2(b) is a sectional view taken along the line IIb—IIb of FIG. 1(a).

As seen in FIGS. 2(*a*), 2(*b*), 3(*a*), 3(*b*), 8(*a*), and 8(*b*), the inflatable belt device includes a tongue 10 having a rear portion to which an inflatable belt 14 is connected, a buckle 12 to which the tongue 10 is to be engaged, and a gas generator (inflator) 16 for supplying gas to the buckle 12. The tongue 10 includes a tongue base 18 having a gas passage (duct) 20 and a vent hole 21, a tongue plate 24 connected to the tongue base 18 via a connection pin 22, and a lap belt anchor 25.

The tongue base 18 has a slot 23 into which the tongue plate 24 is inserted. The tongue plate 24 is inserted into the slot 23 and is fixed to the tongue base 18 by the connection pin 22, which penetrates pin holes formed in the tongue plate 24 and the tongue base 18, respectively. The lap belt anchor 25 is attached to the tongue plate 24 by a pin 26.

Figure 11A:
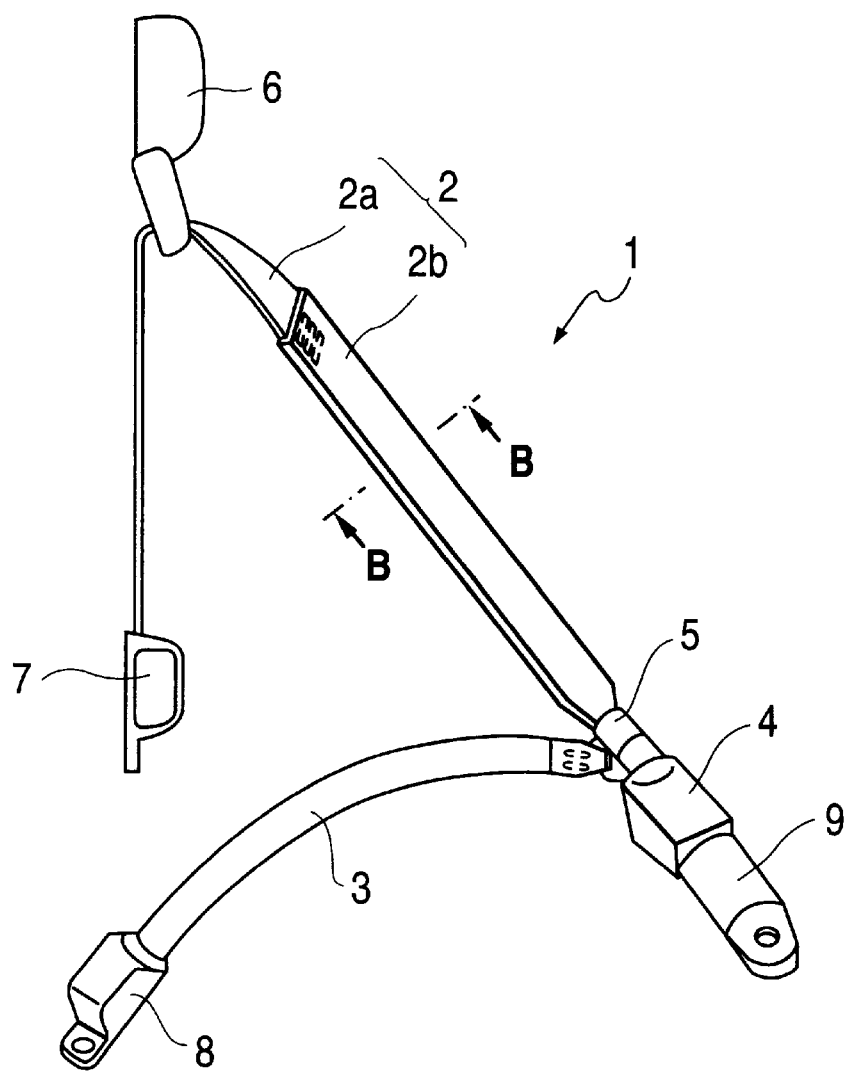
FIGS. 11(a) and 11(b) are structural views of a conventional example.
Figure 11B:
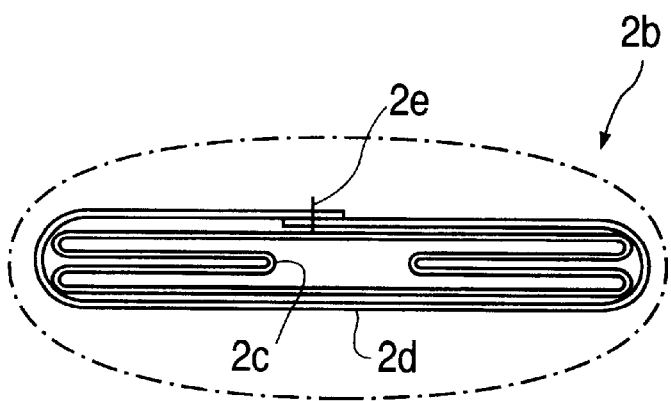

The front end of a lap belt is connected to the lap belt anchor 25. The rear end of the lap belt is allowed to be wound up by a seat belt retractor for the lap belt, in the same manner as described with reference to FIG. 11.

In this embodiment, the inflatable belt 14 constitutes a portion of the shoulder belt, and the rear end of the inflatable belt 14 is connected to the front end of a webbing. The rear end of the webbing is wound up by a seat belt retractor for the shoulder belt.

The tongue base 18 has an oval cylindrical shape. A rear portion of the tongue base 18 is inserted into the inflatable belt 14. The front end of the inflatable belt 14 is folded back at a hook ring 31 and is clamped between a wedge ring 32 and the tongue base 18.

The inner peripheral surface of the wedge ring 32 and the outer peripheral surface of the tongue base 18, which confronts the wedge ring 32 surface, are mutually tapered. When a force is applied to the inflatable belt 14 in the pulling out direction (toward the top in FIGS. 2 and 3), the hook ring 31 is pulled in the pulling out direction. The tapered surface of the inner peripheral surface of the wedge ring 32 is thereby pressed against the tapered surface of the outer periphery of the tongue base 18. As a result, the inflatable belt 14 is firmly clamped between the outer periphery of the tongue base 18 and the inner surface of the wedge ring 32.

The tongue base 18 and the rings 31 and 32 are covered by a tongue cover 30. The tongue cover 30, preferably, is constructed from synthetic resin. The tongue over 30 has a flange 34 extending inward toward the belt 14. The flange 34 presses against the inflatable belt 14, thereby conforming the inflatable belt 14 to the rear end surface of the tongue base 18. As the result, the inflatable belt 14 assumes a flat band configuration in the vicinity of its connection to the tongue 10.

Figure 4:
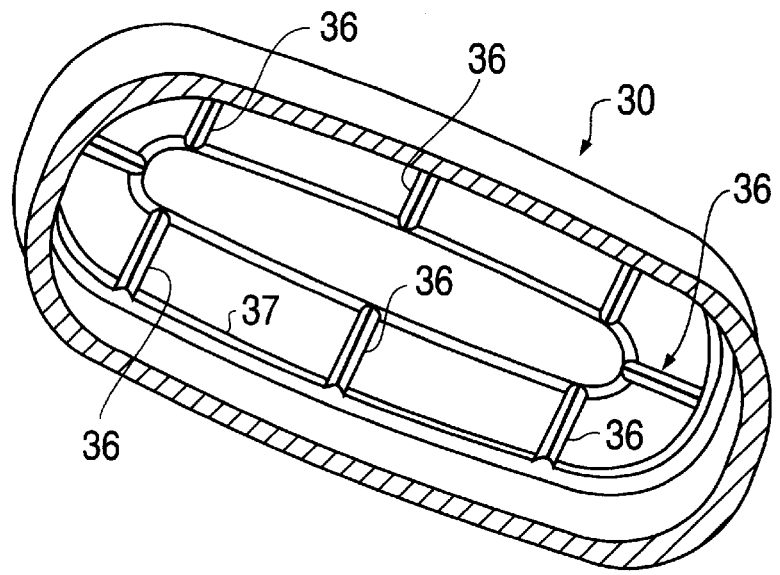
FIG. 4 is a perspective view of a tongue cover.
Figure 5:
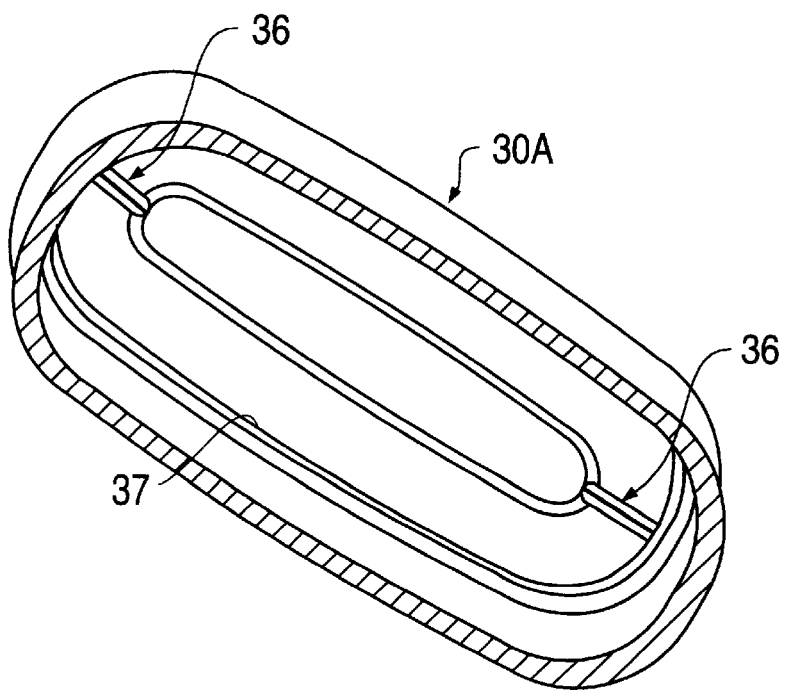
FIG. 5 is a perspective view of another tongue cover.
Figure 6:
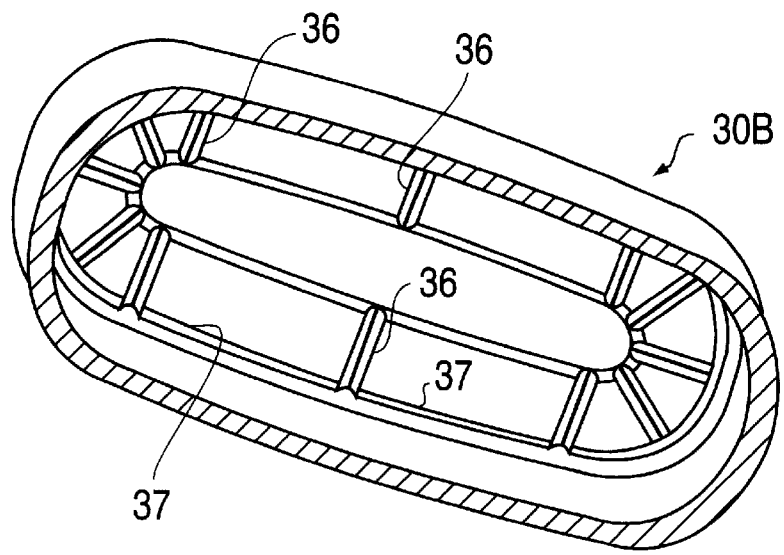
FIG. 6 is a perspective view of yet another tongue cover.

As shown in FIGS. 4–6, tear lines 36 are formed in the inner surface of the flange 34. The tear lines 36 are made up of grooves extending outward from an inner periphery of the cover 30. In addition, a groove 37 is formed in the corner portion between the flange 34 and the tongue cover 30. FIG. 4 shows the flange having eight tear lines 36 extending from the inner periphery to the groove 37. In FIG. 5, there are only two tear lines 36. In FIG. 6, there are twelve tear lines 36. Of course, there may be any number of tear lines in addition to the specific embodiments set forth in FIGS. 4–6.

As will be described later, as shown in FIG. 1(*b*), when gas is supplied from the inflator 16 into the inflatable belt 14 via the duct 20, the inflatable belt 14 is inflated and the flange 34 thus tears open along the tear lines 36. As a result, a plurality of flaps is formed. The groove 37 provided along the bases of these flaps acts as a hinge in aiding the flaps to turn smoothly in the opening direction.

Figure 8A:
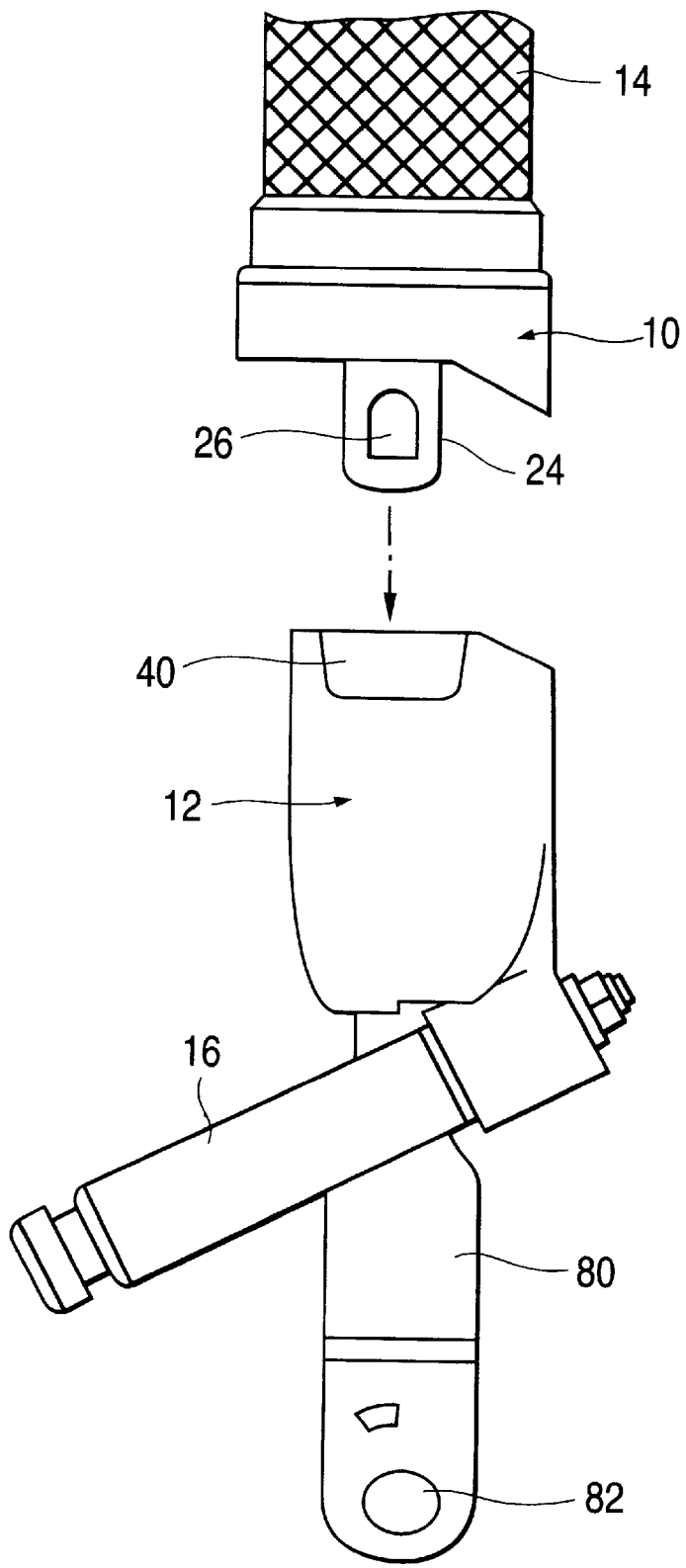
FIG. 8(a) is a front view of a tongue and a buckle of an inflatable belt.
Figure 8B:
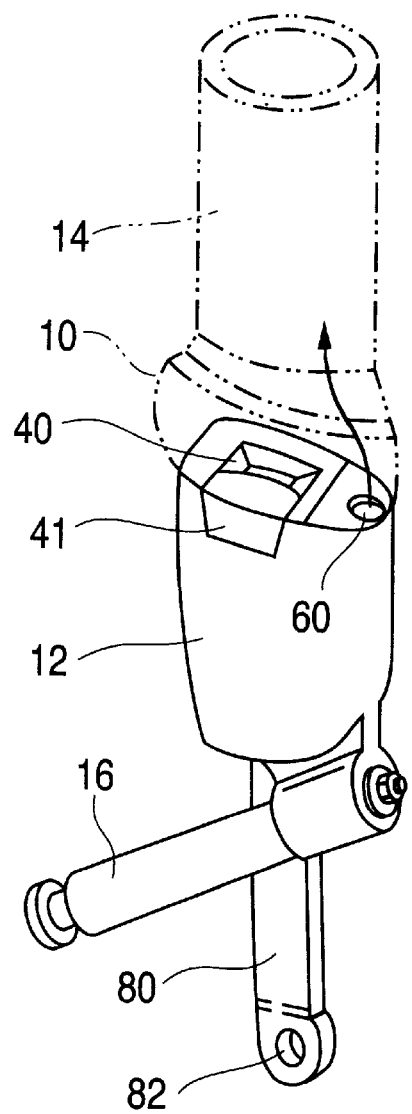
FIG. 8(b) is a perspective view of the buckle.

As shown in FIGS. 8(*a*) and 8(*b*), the tongue plate 24 is inserted into a tongue plate insertion slot 40 of the buckle 12. A latch hole 24*a* of the tongue plate 24 engages with a pawl of a latching mechanism 38 in the buckle 12, thereby latching the tongue plate 24. The latch is released by pressing a press button 41 provided in the buckle 12. At the same time, the tongue plate 24 is pushed out of the buckle 12 by a spring.

Figure 9:
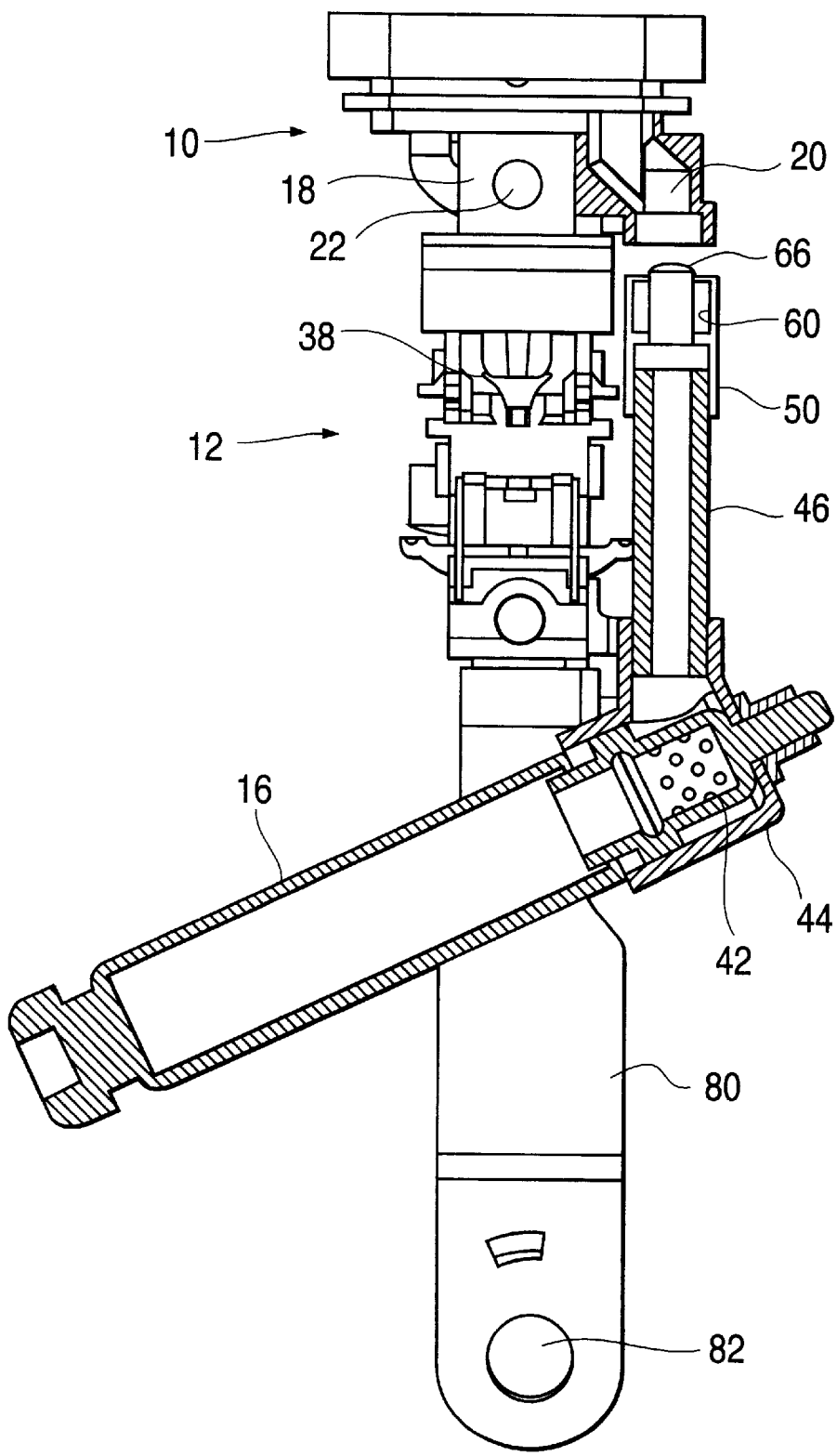
FIG. 9 is a structural view showing the internal construction of the buckle and the tongue of FIG. 10.

As shown in FIG. 9, a gas passage or duct 46, including a pipe, is connected, via an attachment 44, to a gas nozzle 42 at the end of the inflator 16. A base portion of a piston holder 50 is fixed to an end portion of the duct 46. The piston holder 50 preferably has a substantially cylindrical shape and has a flange 52 extending inward from its end. A piston 60 is held by the piston holder 50 so that it protrudes from the end of the buckle 12.

As shown in FIGS. 10(*a*), 10(*b*), and 10(*c*), the piston 60 preferably has a substantially cylindrical shape and has a large diameter portion 62 at the rear and a small diameter portion 64 at the front. The small diameter portion 64 penetrates the flange 52 of the piston holder 50. The large diameter portion 62 is sized so that it cannot pass through the flange 52. The end surface of the piston 60 preferably is closed with a cap 66. The cap 66, preferably, is provided with tear lines 68, which are constructed from shallow grooves. The tear lines facilitate tearing of the cap 66 when a gas pressure is applied from the inflator 16. When the cap is opened, a plurality of flaps 70 is formed.

The piston 60 is provided with an O-ring 72 that acts as a seal. The O-ring 72 is fitted on the small diameter portion 64 and is located at a step between the small diameter portion 64 and the large diameter portion 62.

As shown in FIG. 9 and FIG. 10(a), when the tongue 10 is engaged with the buckle 12, the end of the piston 60 confronts the inlet of the duct 20 of the tongue 10. When the inflator 16 is actuated and gas pressure pushes the piston 60 forward to its limit, the end of the piston 60 enters into the duct 20. Then the cap 66 tears open while the end of the piston 60 is in the duct 20. The front end portions of the flaps 70 also enter the duct 20.

The buckle 12 is provided with a bracket 80 protruding downward from the bottom of the buckle 12. The buckle 12 can be anchored to a vehicle body member by passing a bolt through a bolt hole 82 formed in the bracket 80.

Figure 7:
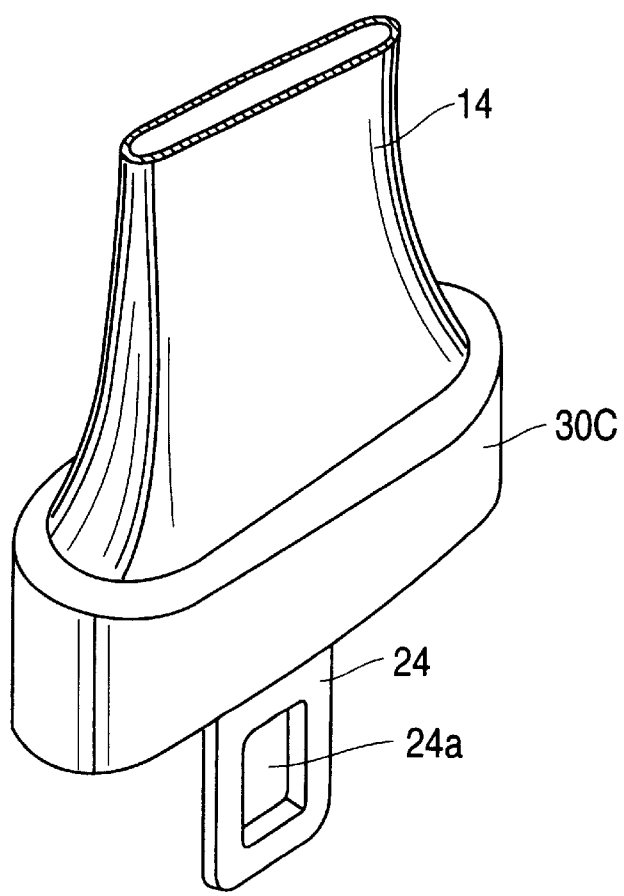
FIG. 7 is a perspective view of a tongue cover without a flange and the inflatable belt connected to the tongue to clarify the effect of the present invention.

As shown in FIG. 1, in the inflatable belt device of the present invention, prior to the inflator 16 being actuated, the inflatable belt 14 has a flat-band shape in the region adjacent to the tongue 10. The flat-band configuration is a result of the flange 34 of the cover 30 acting on the inflatable web. In contrast, as shown in FIG. 7, if a tongue cover 30C without the flange 34 is used, then the inflatable belt 14 will spread out in a tent-like fashion in the region near the tongue.

When an occupant wears this inflatable belt device, the tongue 10 is inserted into the buckle 12, as shown in FIG. 9. At this point, the tongue plate 24 is inserted into the tongue plate insertion slot 40 and is latched by the latching mechanism 38 as described above. At the same time, as shown in FIG. 10(a), the end of the piston 60 confronts the gas inlet of the duct 20.

When the inflator 16 is actuated, which is caused by a vehicle collision or roll-over while the tongue is engaged, gas is supplied through the duct 46 into the piston 60, thereby pushing the piston 60 forward. The piston 60 advances until the large diameter portion 62 hits the flange 52 at the O-ring 72. Then, the cap 66 tears open and gas flows into the inflatable belt 14 through the duct 20, thereby inflating the inflatable belt 14.

At this time, the flange 34, which serves as the belt conforming member, tears open along the tear lines 36. The flange is thus divided into a plurality of flaps. The flaps are bent along the groove 37 at their respective base portions and turn in the opening direction as shown in FIG. 1(b).

When the load of the occupant is charged on the fully inflated inflatable belt 14, gas in the inflatable belt 14 is gradually released through the vent hole 21, thereby absorbing the resultant impact on the occupant caused by the inflatable belt 14 and protecting the occupant.

In addition, in this embodiment, the tips of the flaps 70 enter into the duct 20 as shown in FIG. 10(c) so that the flaps 70 close the gap between the duct 20 and the outlet of the piston 60, thus enabling gas to be supplied to the inflatable belt 14 via the duct 20 entirely or almost entirely without any leakage to the outside.

Moreover, in this embodiment, the O-ring 72, which is fitted on the piston 60, is in elastic contact with the outer surface of the piston 60 and the inner periphery surface of the piston holder 50. This arrangement prevents gas from leaking and prevents contact noise from occurring, which may result from vibrations while the piston 60 and the piston holder 50 are in contact.

Also, when the piston 60 advances to its limit and its large diameter portion 62 hits the flange 52, the O-ring 72 intervenes between the large diameter portion 62 and the flange 52. This suppresses the contact noise that may result from contact between the large diameter portion 62 and the flange 52.

In the buckle 12 of this embodiment, when the tongue 10 is not engaged, the cap 66 closes the outlet of the piston 60, thereby preventing foreign debris from entering into the piston 60 and the duct 46. This also prevents foreign matters from accompanying gas into the inflatable belt 14 upon actuation of the inflatable belt device.

Hence, according to the invention, the inflatable belt assumes a flat-band configuration as far as the portion adjacent to the tongue. As a result, the belt, in the vicinity of the tongue, will have an improved feel when touched.

Additional advantages and modifications will readily occur to those skilled art. The invention in its broader aspects, therefore, is not limited to the specific details, and embodiments, shown and described herein. Accordingly, various modifications may be made without departing from the spirit or scope of the general inventive concept as defined by the appended claims and their equivalents.

Japanese Patent Application H10-145846, filed May 27, 1998, as well as Priority document, Japanese Patent Application H10-143010, filed May 25, 1998, are hereby incorporated by reference.

What is claimed is:

1. A safety restraint system for an automotive vehicle, the safety restraint system comprising:
 a webbing;
 an inflatable safety belt attached at a first end to the webbing; and
 a tongue having a first end attached to a second end of the safety belt, the tongue including:
  a plate extending outward from a second end of the tongue;
  a cover surrounding the second end of the inflatable safety belt and the first end of the tongue;
  a belt conforming member integrally formed with, and extending substantially perpendicularly inward from the cover;
  a groove provided along a corner portion between the belt conforming member and the cover; and
  wherein the belt conforming member conforms the second end of the inflatable belt to a first end surface of the tongue; and
 a buckle adapted to be attached to the vehicle body and adapted for receiving the plate of the tongue.

2. A tongue for an inflatable belt comprising a rear end adapted to be coupled to the inflatable belt, and a belt conforming member adapted to conform an end of the inflatable belt to the rear end surface of the tongue and a cover covering an outside of the tongue and wherein the belt conforming member includes a flange extending inward from the cover and formed integrally with the cover.

3. A tongue according to claim 2, further comprising a groove provided along a corner portion between the belt conforming member and the cover.

4. A tongue according to claim 2, wherein the belt conforming member includes at least one tear line extending outward from an inner periphery of said belt conforming member, such that the flange tears along the at least one tear line.

5. A tongue according to claim 4, further comprising a groove provided along a corner portion between the belt conforming member and the cover.

6. A tongue according to claim 4, wherein the at least one tear line includes twelve tear lines.

7. A tongue according to claim 4, wherein the at least one tear line includes six tear lines.

8. A tongue according to claim 4, wherein the at least one tear line includes four tear lines.

9. A tongue according to claim 2, wherein the belt conforming member extends inward substantially perpendicularly from the cover.

10. A tongue comprising a rear end adapted to be coupled to an inflatable belt, and a belt conforming member adapted to conform an end of the inflatable belt to the rear end surface of the tongue wherein the belt conforming member includes a synthetic resin.

11. An inflatable belt device comprising:

an inflatable belt;

a tongue coupled to the inflatable belt;

a cover surrounding a joint where the tongue and the inflatable belt are coupled;

a belt conforming member integrally formed with the cover, wherein the belt conforming member conforms an end of the inflatable belt to a rear end surface of said tongue; and a groove provided along a corner portion between the belt conforming member and the cover.

12. An inflatable belt device according to claim 11, wherein the belt conforming member includes a flange and at least one tear line extending outward from an inner periphery of said belt conforming member, such that the flange tears along the at least one tear line.

* * * * *